United States Patent [19]

Zandona et al.

[11] Patent Number: 4,508,839

[45] Date of Patent: Apr. 2, 1985

[54] CATALYST FOR THE CONVERSION OF CARBO-METALLIC CONTAINING OILS

[75] Inventors: Oliver J. Zandona, Ashland; William P. Hettinger, Jr., Russell; Stephen M. Kovach, Ashland; Hubert W. Beck, Russell, all of Ky.

[73] Assignee: Ashland Oil, Inc., Ashland, Ky.

[21] Appl. No.: 296,679

[22] Filed: Aug. 27, 1981

[51] Int. Cl.$^3$ .............................................. B01J 29/08
[52] U.S. Cl. ........................................ 502/65; 502/68
[58] Field of Search .................................. 252/455 Z

[56] References Cited

U.S. PATENT DOCUMENTS

| | | | |
|---|---|---|---|
| 3,867,308 | 2/1975 | Elliott, Jr. ....................... | 252/455 Z |
| 4,022,714 | 5/1977 | Elliott, Jr. ....................... | 252/455 Z |
| 4,198,319 | 4/1980 | Alafandi et al. ................ | 252/455 Z |
| 4,261,861 | 4/1981 | Tu et al. .......................... | 252/455 Z |

*Primary Examiner*—Carl F. Dees
*Attorney, Agent, or Firm*—Richard C. Willson, Jr.; Charles A. McCrae

[57] ABSTRACT

An improved process and catalyst for economically converting carbo-metallic oils to lighter products. This process is practiced in accordance with effective metals management, carbon management and catalyst activity management combined with feed atomization-vaporization, efficient stripping of carbonaceous material from the coked catalyst, exothermic and endothermic removal of hydrocarbonaceous material to effectively maintain the RCC unit in heat balance. This reduced crude cracking process is practiced with a new and improved catalyst composition identified as RCCC-1 Special that is characterized by the following composition; at least 30 wt % rare earth exchanged "Y" faujasite crystalline zeolite with a silica to alumina ratio of at least 5 of a high lanthanum to cerium ratio and residual sodium content less than 0.30 wt %, is provided with a pore volume greater than 0.35 cc/gm. and comprises a clay matrix material that may or may not be acidic with pore size openings in the range of 500 to 2,000 angstroms. The RCCC-1 Special can contain metal promoters to catalyze the endothermic removal of coke and the partial removal of hydrogen present in the carbonaceous material with carbon dioxide. In addition, metal additives to passivate and immobilize vanadium are contemplated.

2 Claims, 1 Drawing Figure

CATALYST FOR THE CONVERSION OF CARBO-METALLIC CONTAINING OILS

The well known process of gas oil fluid catalytic cracking (FCC) is not designed or tailored for use in the catalytic conversion of carbo-metallic containing oil feeds known as residual oils or reduced crudes comprising carbo-metallic components boiling above 1025° F. and regeneration of catalyst particles used therein. Gas oil fluid catalytic cracking operations were generally restricted to processing feeds comprising less than one weight percent of Conradson carbon and comprising metal contaminants of Ni, V, Fe and Cu in amounts preferably less than about 0.5 ppm. The catalysts employed in gas oil fluid catalytic cracking operations are generally discarded when their catalyst MAT activity is below about 70% and the contaminant metals has reached from 1000 to 3000 Ni+V.

The development of fluid catalytic cracking was for the conversion of select fractions obtained from crude oils to produce particularly gasoline and heating fuels. The select feedstock for FCC gas oil operations comprise atmospheric and vacuum gas oils, generally boiling below about 1025° F. and most desirably with a low Conradson carbon content, below 1 wt %, a low metals content, below 0.5 ppm Ni+V and low in sulfur and nitrogen components. More typical (GO) gas oil feedstocks comprising atmospheric and vacuum gas oils contain less than 0.5 wt % Conradson carbon and 0.1-0.2 ppm Ni+V. The initial boiling point of gas oil is generally about 430° F. to 650° F. and up to about 1025° F. but may go up to 1050° F. with some crude oils. The gas oil feed for FCC operations is preheated to a temperature in the range of 500°-800° F. and thus is substantially completely vaporized immediately upon contact with hot regenerated catalyst at temperatures in the range of 1150°-1450° F. This complete vaporization of the feed by the catalyst in a riser reactor results in a relatively high conversion (>70%), high gasoline product selectivities (>70%) and most usually low carbon values (<1 wt % on catalyst, about 4 wt % on feed). The catalyst so utilized gradually accumulates some metal contaminants after an extended period of operation in the range of about 500-3,000 ppm Ni+V before the catalyst is gradually and/or continuously replaced with fresh catalyst added to maintain an equilibrium state of conversion and metals level. The FCC process as practiced today provides high coke and gas makes with elevated metal levels and a lowered gasoline selectivity, thus necessitating considerable catalyst withdrawal and additions of fresh catalyst. Secondly, the coke make or carbon deposition as hydrocarbonaceous material on the catalyst is relatively low by comparison with more severe operations such as reduced crude cracking; thus only necessitating regeneration temperatures generally below 1400° F. and in the range of 1200° to 1350° F. However, processing reduced crudes and residual oils of high Conradson carbon under FCC operating conditions with known FCC catalysts is a most difficult problem contributing to reduced catalyst life and requiring high catalyst inventory. Reduced crude processing goes against substantially all processing principles practiced in gas oil FCC technology in that (1) reduced crudes charged for catalyst contact are only partially vaporized; (2) reduced crudes have a high metals content resulting in high metals deposition and rapid accumulation on catalyst particles, (3) reduced crudes have high coking values contributed by naphthenes and asphaltenes; and (4) processing reduced crudes and residual oils contributes to high deposition of hydrocarbonaceous material and thus high temperature by oxygen burning during regeneration.

In reduced crude processing one must necessarily give consideration to high metals loading on catalyst management, high carbon and hydrogen deposition in catalyst management, maintaining unit heat balance, and avoiding uneconomic waste, and more particularly emphasizing catalyst activity management by providing a catalyst having sufficiently unique properties for handling substantially all of the above related problem areas in an efficient and economic program.

SUMMARY OF THE INVENTION

The RCC reduced crude cracking process practiced in accordance with this invention, utilizes a combination of feed atomization-vaporization properties which restricts the feed partial pressure, effectively pursues metals deposition management and handles deposition of large amounts of carbonaceous material. Catalyst activity management and unit heat balance is effectively and efficiently controlled. In a particular aspect, the reduced crude cracking process of this invention is practiced with a new and improved catalyst compositions identified as RCCC-1 Special, that comprises component variations and activity features which contribute in substantial measure to help attain the balance of operation particularly desired.

The heavy oil or reduced crude cracking (RCC) process of this invention utilizes the combination of operating parameters above identified and monitored in a select manner to particularly utilize the heavy feed being processed so that a high level of metals deposition can be used to advantage in disposing of accumulated hydrocarbonaceous material so that the catalyst activity and selectivity can be maintained within a a range particularly providing a desired conversion of the heavy feed in conjunction with providing a heat balanced hydrocarbon conversion–catalyst regeneration operation of economic interest. In yet another aspect, the present invention is economically desirable and practical by the use of a particular crystalline zeolite containing catalyst composition of substantially improved activity-selectivity characteristics at high metals level within the difficult processing environment of a reduced crude cracking operation of high Conradson carbon level which permits a refiner to obtain and retain a desired operating balance. The process of the present invention encompasses the following management considerations.

Feed Vaporization—Since high boiling feed such as a reduced crude feed boiling above 650° F. and comprising carbo-metallic oil component, boiling above 1025° F., or a topped crude oil of such characterization normally has a substantial portion thereof boiling above about 1050° F., requires some particular handling techniques for contacting the feed with hot regenerated catalyst particles and for obtaining the highest degree of feed atomization-vaporization possible upon contact with a suspended catalyst phase. This operating technique is provided in substantial measure by the combination of employing a relatively high temperature up to about 1500° F. regenerated catalyst, a relatively high riser reactor exit temperature, the use of diluents which may or may not disassociate upon contact with the catalyst to lower the partial pressure of the high boiling unvaporized feed in the riser and thereby promote atomized dispersion contact of feed material with the catalyst in the riser cross section. Vaporized feed contact with the catalyst is restricted to less than 4 seconds and more usually in the range of 0.5 to 3 seconds.

Metals Management—Employing the select catalyst compositions of this invention designed particularly for high metals loading tolerance, also provides a metal entrapment composition concomittantly with a special crystalline zeolite of substantial catalyst activity and selectivity. The catalyst is also designed and prepared to sustain the principle that as the metal contaminant increases, crystallite size of the metal also increases which ultimately decreases metal surface area and activity. The novel catalyst composition of this invention can accomodate high levels of metals accumulation due in some respect to the spread in a relatively large pore size structure as herein provided while retaining a high degree of catalyst activity. Passivation of deposited metals, particularly vanadium is contemplated.

Carbon Management—Reduced crudes, residual oils and topped crudes comprise materials boiling above 1050° F. which provide high Conradson carbon values. In normal (FCC) gas oil operations, coke levels are kept low and generally below about 4 wt % based on feed. However, with heavy high boiling oils such as reduced crudes, the coke levels obtained by catalytic cracking are at least about 4 wt % plus the Conradson carbon value of the feed. Thus a reduced crude with a 8 wt % Conradson carbon value will produce summation coke on catalyst values of 4+8 or about 12 wt % or higher values on feed. This and larger amounts of coke when burned with oxygen containing gas in a regenerator will produce in the absence of special restrictions, regenerator temperatures in excess of 1500° F. and up to at least 1600° F. unless special regeneration controls are imposed. These elevated temperatures can lead to regenerator deterioration in the form of metal fatigue, cyclone deformation and inoperation, and catalyst deactivation because of the severity of the conditions encountered. This potential and undesired high temperature regeneration operation is overcome by the present invention through the use of two or more stages of catalyst regeneration operation to remove hydrocarbonaceous deposits to a desired low level. In one step of catalyst regeneration it is contemplated removing from about 30 to about 75% of the deposited carbonaceous material. It is removed at least in part by an oxygen scarce atmosphere so that there is a desired low minimum of oxygen, if any, existing in the flue gas therefrom. The conditions of oxygen regeneration are selected to ensure a high rate of carbon-hydrogen removal with a minimum of heat evolution because of reduced hydrogen present and low oxygen utilization imposed therein favoring production of a low $CO_2/CO$ ratio flue gas. Thus the flue gas is CO rich. A high production of CO contributes to lower heat generation because oxidizing C to form CO releases only 40% of the heat that is released when CO is further oxidized to form $CO_2$. Secondly, a partially regenerated catalyst is sent to a second regeneration stage with only a fraction, if any, of the hydrogen originally deposited. The catalyst is protected initially in a first stage of regeneration by the coke or carbonaceous deposits on the catalyst against hydrothermal degradation and by restricting the temperature of regeneration. In a second stage, the partially regenerated catalyst with residual carbonaceous material and essentially no hydrogen thereon is contacted in one embodiment with air or an oxygen containing gas to completely burn carbonaceous material under controlled temperature conditions in a very low concentration of water, if any, to a lower residual carbon level on the regenerated catalyst, such as below about 0.1 wt %, and preferably below about 0.05 wt %. In addition, the catalyst retention or contact time in the second stage of oxygen regeneration is generally less than the first stage and up to about one-half of the time utilized in the first stage so as to minimize any hydrothermal degradation of the active zeolite cracking component in the catalyst complex.

On the other hand, residual carbon management of the catalyst may be controlled by effecting regeneration of the catalyst comprising hydrocarbonaceous deposits by a sequence of regeneration temperatures restricted not to exceed about 1450° F. with or without a dispersed catalyst phase contact between stages to burn produced CO in a dispersed phase above a dense catalyst phase contact step. A sequential arrangement of oxygen regeneration may be restricted so that a CO rich flue gas may be recovered from each stage of regeneration.

In yet another embodiment, it is contemplated effecting partial regeneration or removal of hydrocarbonaceous material with carbon dioxide ($CO_2$) under endothermic reaction conditions and catalyzed by the metal deposits of reduced crude cracking. Thus effecting partial removal of carbonaceous material and hydrogen may be accomplished at selected elevated temperatures with $CO_2$ before or after partial regeneration of hydrocarbonaceous deposits with oxygen.

The catalyst regeneration environment of this invention is further reduced in severity in substantial measure during achievement of low residual carbon on catalyst below 0.1 wt % by effecting relatively high temperature stripping of the catalyst below about 1000° F. with $CO_2$ rather than with steam as normally employed in FCC operations. Stripping of the catalyst comprising hydrocarbonaceous deposits and metal contaminants with $CO_2$ at temperatures below about 1000° F. or as recovered from the hydrocarbon conversion operation is particularly desirable since the $CO_2$ is relied upon to react primarily with hydrogen present in the carbonaceous deposits to provide among other things a low temperature steam atmosphere having little, if any, hydrothermal deactivating effect on the catalyst. Thus, the amount of hydrogen passed to a higher temperature regeneration for removal by oxygen or $CO_2$ is reduced within the range of 30 to 50 wt %. Furthermore, the temperature excursion or exotherm contributed by oxygen, $CO_2$ or both during removal of hydrogen at more elevated regeneration temperature is considerably reduced. This is of particular merit in reduced cracking operation or similarly heavy oil cracking operations where high levels of hydrocarbonaceous material deposits of the feed are collected on the catalyst particles. It will be recognized by those skilled in the art that the severity of reduced crude cracking and regeneration of catalyst employed therein provides an area of refining technology which needs considerable improvement to preserve catalyst activity and product selectivity. It is applicants' view that the contribution and novel concepts comprising this invention are significant steps forward in this difficult area of reduced crude cracking. Thus the management concepts related to carbonaceous deposits and carbon residue contribute in substantial measure to the concepts of catalyst management discussed herein.

Catalyst Activity Management—The activity management of the catalysts utilized in this invention is based in substantial measure upon the active crystalline zeolite content of the catalyst as an equilibrium catalyst comprising metal contaminants in the range of 8000 to 50,000 ppm and more usually in the range of 8000 to 20,000 expressed as Ni+V ppm and maintaining substantially this activity under the severe hydrocarbon conversion conditions identified. The restricted catalyst regeneration temperature conditions to preserve catalyst activity with metals accumulation as above identified is a critical aspect of the invention. By providing a large amount of carbonaceous material preferably of low hydrogen content on the catalyst charge to the first stage of catalyst regeneration where a substantial portion of carbonaceous deposit of reduced hydrogen content is removed under restricted temperature conditions below 1500° F. and more usually not above about 1400° F., hydrothermal degradation of the zeolite component of the catalyst is virtually eliminated and a CO rich flue gas is provided. Secondly, the catalyst composition of this invention includes a metal getter or a metals accumulator matrix material. Such a material as silica, alumina with or without silica is employed to tie up the metals as a spinel or as aluminates, etc. More particularly, vanadium accumulated on the catalyst is immobilized by forming compounds with special additive materials to provide compounds having a melting point above the temperatures of regeneration, that is, above 1500° F. In a more important aspect, the concentration of the crystalline zeolite comprising the catalyst composition is increased from below about 20 wt % as used with the more conventional FCC cracking catalysts up to at least about 30 and up to about 40 wt %. Generally, conventional gas oil FCC catalysts contain less than 15 wt % zeolite because of the high activity of CREY for example. In addition to the above, the catalyst withdrawal and addition rates are modified or adjusted to maintain an equilibrium operating catalyst in a specific embodiment with a metals loading of at least 5000 up to about 25,000 or up to as high as 50,000 ppm Ni equivalents. Thus the rate of catalyst replacement will vary with the type of feed employed, the identification of the dominant metal contaminant in the feed and the equilibrium catalyst state for a desired cracking operation.

Unit Heat Balance Management—Regeneration of a highly coked catalyst comprising hydrogen or comprising hydrocarbonaceous deposits will result in the development of high temperatures (>1400° F.) during combustion with oxygen unless carefully controlled as above mentioned and also high steam partial pressures at the temperatures encountered. It is known that such an operation will result in rapid and severe degradation of the active zeolite cracking component of the catalyst. In order to maintain the reaction temperature in a riser reactor within a predetermined desired range using a catalyst temperature above 1400° F. a lower C/O ratio must be utilized which will lead to lower conversions and poorer product selectivity. Thus restricting the regenerated catalyst temperatures not to exceed about 1400° F. is an important aspect of this invention. The combination hydrocarbon conversion-catalyst regeneration process of this invention is thus restricted to maintain the unit in substantially complete heat balance by employing low feed preheat temperatures (requiring more heat to partially vaporize the feed with the catalyst); water and/or steam addition with at least the feed charged to the riser reactor (heat of vaporization of the feed and water to control heat input in the riser); and the employment of a temperature restricted multiple-stage regeneration operation as herein provided with production of a flue gas of high CO concentration.

It is clearly evident that the combination operation of this invention is novel in many aspects of the combination since it is a temperature controlled but heat balanced operation which relies upon a novel approach in a sequence of steps for removing hydrocarbonaceous deposits of reduced crude cracking whereby catalyst activity will be sustained for a relatively long on-stream operating period during the accumulation of high metals levels deposited by the reduced crude feed. In yet another aspect, the catalyst composition employed is endowed with a much higher order of cracking activity provided by a special crystalline zeolite and metals accumulation tolerance by virtue of its zeolite content, pore volume and pore size distribution particularly suitable and selected for a reduced crude cracking operation. A further aspect of the concepts of this invention is not only concerned with altering some undesirable characteristics of deposited metal components but in utilization thereof to particularly promote catalyzed removal of carbon and hydrogen with $CO_2$ as herein provided.

DISCUSSION OF SPECIFIC EMBODIMENTS

Figure 1:
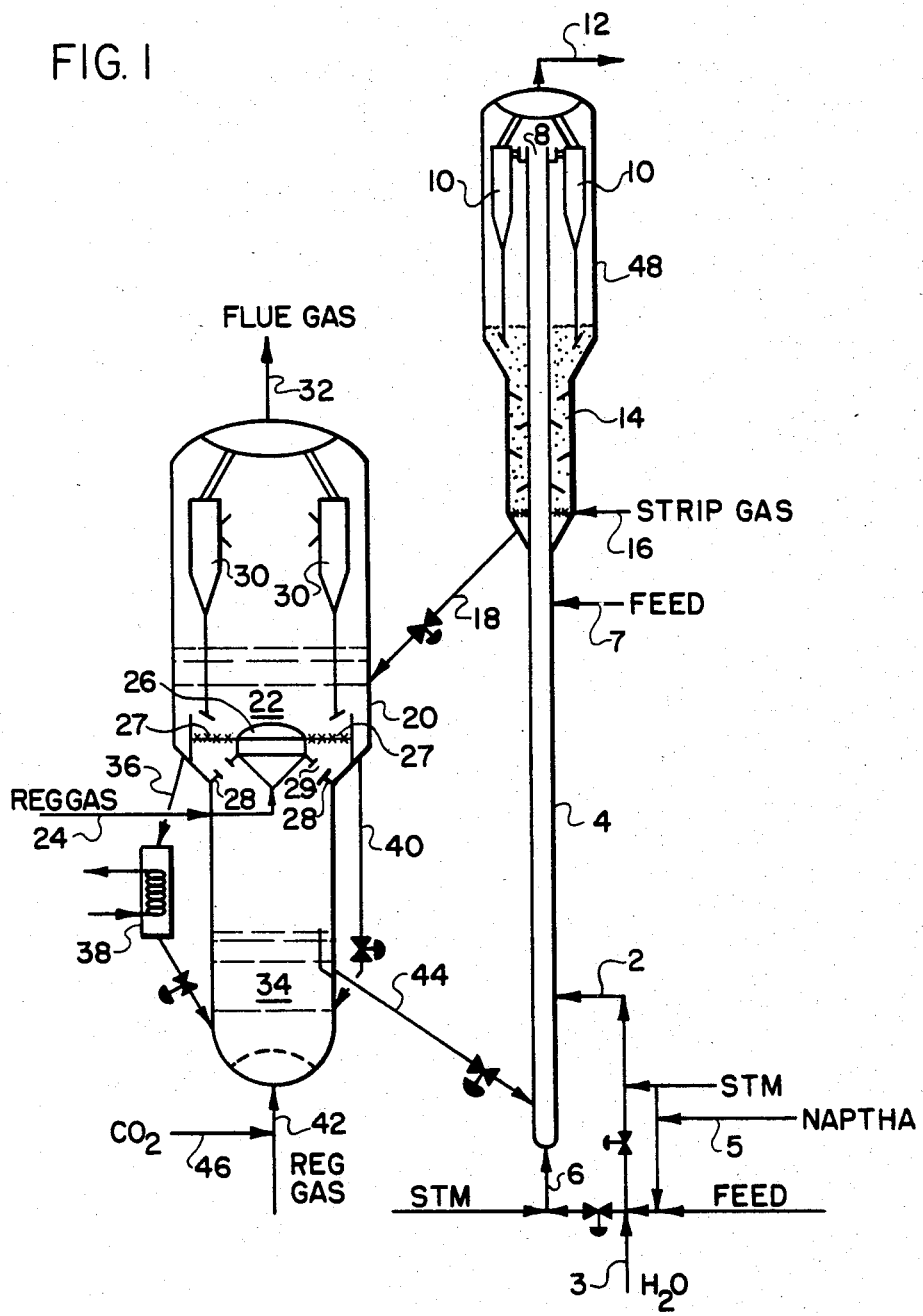
FIG. 1, is a diagrammatic sketch in elevation of an arrangement of apparatus for practicing the catalytic cracking of reduced crudes within the operating parameters herein identified.

It is recognized that the novel concepts of this invention contributing to the desirable economic factors of the process are normally given little consideration, if any, in judging the patentability of one or more novel concept contributions to a combination invention. However, it is also recognized that an economic comparison between a gas oil cracking operation and an operation for the cracking of reduced crudes and such materials cannot be ignored since in the absence of significant economic contributing operating departures amounting to novel concepts, reduced crude upgrading could not be considered a viable process. The meaningful operating departures of this invention are found to exist in the management considerations above identified and discussed in conjunction with using a special class of catalyst compositions herein referred to as RCCC-1 Special, the characterization of which is more fully defined below.

In evaluating the processing concepts of this invention and the special catalyst composition identified, it was determined that the special catalyst composition employed in the manner herein identified would provide a savings of at least $7000 per day for 40,000 B/D reduced crude cracking unit which amounts to a savings of at least $2.5 MM/yr.

A review of data obtained from a reduced crude cracking operation and reported in the following tables provides a meaningful comparison of the special catalysts utilized and identified herein. Table A below, summarizes the metals levels of the processed feedstock, Conradson carbon levels, and catalyst metals level of the operating periods of the data.

TABLE A

RCCDU CATALYST REQUIREMENT COMPARISON - FEEDSTOCK METALS, CON. CARBON, CATALYST METALS LEVEL

| CATALYST | RCC Operation Period | FEEDSTOCK 1. ABL/Dubal 2. Ithmus/Maya % Red Cr. with VGO | Total bbl/day | Metals Ni ppm | Metals V ppm | Metals Na ppm | Con C wt % | CATALYST Metals Ni ppm | CATALYST Metals V ppm | CATALYST Metals Na ppm |
|---|---|---|---|---|---|---|---|---|---|---|
| RCCC-1 8/80 Special #1 | (RCC #82–86) | 1 85% | 152 | 15 | 39 | 4 | 6.8 | 2500 | 7500 | 4700 |
| RCCC-1 10/80 Special #2 | (RCC #116–122) | 2 58% | 205 | 9 | 45 | 3 | 4.8 | 2000 | 7600 | 4000 |
| RCCC-1 1/23/81 Special #3 | (RCC #130–136) | 2 54% (3) | 151 | 15 | 65 | 1 | 5.9 | 2400 | 9200 | 4100 |

(2) Includes 34% ABL
(3) Includes 30% ABL

TABLE B

RCC CATALYST REQUIREMENT COMPARISON - CONVERSION AND RELATIVE ACTIVITY BASED ON CATALYST ADDITION RATES

| CATALYST | RCC Opn's Period | FEEDSTOCK (1) ABL/Dubal (2) Ithmus/Maya % Red Cr. with VGO | Total bbl/day | CATALYST ABD (Loose) Kg/L As Rec'd | CATALYST ABD (Loose) Kg/L Ign. wt. Content | RCCDU Conv. Vol. % 1000% F RXT | RCCDU Rel. Act. | MAT Conv. Vol. % | MAT Rel. Act. | Nom. Vol. gal/day | As Rec'd lb/day | Actual (5) lb/bbl. | CATALYST ADDITION RATE (5) lb/bbl. for 69% RCCDU Conv. (51 RA) | (6) lb/bbl. for 65% MAT Conv. (32 RA) |
|---|---|---|---|---|---|---|---|---|---|---|---|---|---|---|
| RCCC-1 Special #1 | RCC (82–86) | (1) 85% | 152 | .72 (4) | .61 | 68.5 | 48 | 64 | 29 | 38 | 260 | 1.45 | 1.54 | 1.60 |
| RCCC-1 Special #2 | RCC (116–122) | (2) 58% | 205 | .71 (4) | .64 | 71.9 | 70.5 | 66.5 | 38 | 51 | 344 | 1.51 | 1.09 | 1.27 |
| RCCC-1 Special #3 | RCC (130–136) | (2) 54% (3) | 151 | .72 | .63 | 68.2 | 46 | 66 | 35 | 38 | 260 | 1.51 | 1.67 | 1.38 |

(4) Estimated from calcined ABD; note that lightly packed ABD is 14% higher, than as rec'd loose-poured ABD, as determined by weighing catalyst versus water.
(2) Includes 34% ABL
(3) Includes 30% ABL
(5) Ignited or dry catalyst weight basis Table B provides a further summary for the same special catalysts, with respect to catalyst addition rates, catalyst density along with catalyst activity information. To assist with and provide a basis for evaluating the data, a relative activity figure was generated for making a comparison between reduced crude cracking and MAT gas oil conversion levels. When using the determined relative activity factor to make an adjustment to comparable activity levels as between RCC conversion and MAT gas oil conversion, one can arrive at an estimate of catalyst requirements. For example, in Table B below, for RCCC-1 Special 1, the as-found 64% MAT conversion (29 R.A.) for 1.45 lb./barrel operation is converted to 65% conversion 32 (R.A.) by using the ratio of relative activities: $1.45 \times (32/29) = 1.60$ lbs/bbl. It will be noted that an RCC conversion of 69% (=51 R.A.) is found to be the equivalent of a MAT conversion of 65% (=32 R.A.) for the periods shown on average.

Table C below provides an overall summation of an economic comparison using MAT relative activity relationships and a current figure for catalyst cost of $2400/ton. It will be observed from these data that catalyst costs vary considerably as the feed Conradson carbon goes from 4.8 to 6.8 and as the catalyst relative activity changes from 29 to 38 and determined as above identified.

TABLE C

RCCDU CATALYST REQUIREMENT COMPARISON

| Catalyst | RCCDU Operation # | FEEDSTOCK Total N, ppm | FEEDSTOCK Basic N ppm | FEEDSTOCK Con. C Wt % | CATALYST ABD Kg/L As Rec'd Ignited Content | MAT Conv. V % | MAT Rel. Act. | Dry Catalyst Add'n lb/bbl. calc. for 65% conv. Mat - 32 RA | $/bbl | Catalyst Cost $ for 40,000 bbls |
|---|---|---|---|---|---|---|---|---|---|---|
| RCCC-1 Sp'l #1 | 82–86 8/23–9/4/80 | (1) 2200 | 500 | 6.8 | .72 (.61) | 64 | 29 | 1.60 | 1.92 | 77,000 |
| RCCC-1 Sp'l #2 | 116–122 12/11–12/24/80 | (2) 1000 | 400 | 4.8 | .71 (.64) | 66.5 | 38 | 1.27 | 1.52 | 61,000 |
| RCCC-1 Sp'l #3 | 130–136 1/26–2/3/81 | (2) 1900 | 420 | 5.9 | .72 (.63) | 66 | 35 | 1.38 | 1.66 | 66,000 |

(1) 85% combined ABL/Dubal + VGO
(2) 54–61% combined ABL/Isthmus-Maya + VGO
ABD = average bulk density Referring now to FIG. 1 by way of example there is shown an arrangement of apparatus for practicing the processing management concepts of this invention with the special catalyst composition herein identified which operation permits a viable and economic reduced crude cracking operation. In the specific arrangements of FIG. 1, and comprising one specific operating embodiment, the hydrocarbon feed comprising a reduced crude, residual oil or a topped crude comprising carbon-metallic oil impurities boiling above about 1025° F. is charged to a riser reactor conversion zone through one of the feed inlet conduit means 6, 2 or 7 as desired to provide a vaporized hydrocarbon residence contact time with catalyst in the riser within the range of 0.5 seconds up to about 3 or 4 seconds but more usually within the range of 1 to 2 seconds. The hydrocarbon feed so charged may be mixed with one or more of water, steam, naphtha, fuel gas or other suitable gasiform diluent material or a combination of these materials which will operate to achieve conversion of the feed desired, reduce the feed partial pressure, effect temperature control, and effect atomization-vaporization of the feed before and during contact with hot cracking catalyst charged by conduit 7 to an upper portion of the riser reactor to reduce hydrocarbon residence time. Provisions, not shown, are provided for adding one or more of the materials above identified for promoting the conversion desired, effect temperature control and assure efficient atomization-vaporization of the charged high boiling feed. In the hydrocarbon conversion operation of this invention, the high boiling charged oil feed comprising a reduced crude or residual oil may be as temperature recovered from, for example, an atmospheric distillation zone or a vacuum distillation zone (not shown). The feeds processed by this invention comprise materials having an initial boiling point as low as 650° or 700° F. or a higher boiling portion of the crude oil, such as heavy vacuum gas oil and higher boiling residue material may be charged as the feed.

In the riser cracking zone 4, an upflowing suspension of the hydrocarbon feed, diluent material and suspended hot catalyst particles is formed at an elevated temperature sufficient to provide required endothermic heat of cracking and provide a vaporized hydrocarbon product-catalyst suspension at the riser discharge at a temperature within the range of 950° F. up to about 1150° F., and more usually at least about 1000° F. depending upon the severity of cracking and product slate desired. The riser cracking operation of this invention is accomplished with the special high activity-metals tolerant zeolite containing cracking catalyst herein defined and characterized as RCCC-1 Special at a hydrocarbon residence time in the riser preferably less than about 2 seconds and within the management parameters herein defined.

The suspension following traverse of riser 4 is rapidly separated as by ballistic separation or other comparable means at the riser discharge 8 so that vaporous material with any entrained particle fines can be further separated in adjacent cyclone separating equipment 10 before recovery of vaporized hydrocarbons by conduit 12. The recovered vaporous hydrocarbons are passed to separation equipment not shown for recovery of desired product fractions comprising $C_2$-$C_5$ hydrocarbons, naphtha, gasoline, light and heavy fuel oil product fractions. Of these recovered product fractions, it is contemplated recycling recovered dry gas, naphtha or a mixture of $C_2$-$C_5$ hydrocarbons as diluent material.

The upper end of riser 4 is confined within a vessel means 48 which is contiguous in the lower portion with an annular stripping zone about the riser in the specific arrangement of the drawing. It is contemplated however using an external cylindrical stripping zone in association with a bottom portion of the catalyst collecting vessel 48 through which riser 4 does not pass. The catalyst separated at the riser discharge and by the cyclones is collected about riser 4 in the specific arrangement of FIG. 1 and passed down through an annular stripping zone countercurrent to stripping gas charged by conduit 16. The stripping of catalyst in zone 14 is preferably accomplished at a temperature of at least 950° F. and is more desirably effective when accomplished at elevated temperatures of at least 1000° F. In this stripping environment, it is contemplated charging steam as a stripping medium in one embodiment to remove vaporized hydrocarbon material. In another embodiment it is preferred to employ high temperature $CO_2$ recovered from an available source such as the combustion of CO rich flue gas obtained as herein provided or from other available sources as the stripping gas.

The use of $CO_2$ as the stripping medium where relatively high levels of hydrocarbonaceous materials are deposited on the catalyst is to obtain reaction with and at least partial removal of hydrogen associated with the carbonaceous deposits. The reaction of $CO_2$ with hydrogen to produce CO and water is known as the Hettinger reaction which is a very slightly exothermic reaction accomplished at temperatures in the range of about 1000° to 1200° F. Thus the promotion of this reaction in a stripping section requires no cooling of catalyst separated from the riser reactor when exiting at a temperature of at least 1000° F. This partial removal of hydrogen is desirable prior to oxygen regeneration of the catalyst because of the high heat released by combustion of hydrogen with oxygen. Thus by removing from 30 to 50% of the hydrogen with $CO_2$ in a stripper, heat management during oxygen regeneration may be more easily controlled.

As identified above, a reduced crude cracking operation defers in kind from a normal gas oil fluid cracking operation rather than just in a difference in operating degree because of the severity of the operation. The metal loading which must be tolerated by the RCC cracking catalyst at a desired catalyst activity and selectivity as well as the high level of hydrocarbonaceous material (coke plus hydrogen) deposited on the catalyst during the cracking of high boiling carbo-metallic containing reduced crudes is a major departure in the cracking art. In this severe catalyst deactivating operating environment, it is recognized that the deposited metals are associated with deposited hydrocarbonaceous material and applicants have observed that high temperature stripping in a turbulent atmosphere appears to contribute to some removal of deposited metals such as nickel since its level of accumulation does not continue to parallel that of vandadium.

It is contemplated effecting at least a partial removal of deposited carbonaceous material on the contaminated catalyst in a zone separate from the normal catalyst stripping zone accomplished with either $CO_2$ or steam. Thus the catalyzed reaction of $CO_2$ with carbon may be effected at temperatures in the range of 1300° to 1500° F. and hydrogen can be further removed with $CO_2$ as above discussed in substantial measure in a zone separate from the stripping zone or in an oxygen regeneration zone for the catalyst. Thus, it is contemplated effecting partial regeneration of the catalyst under endothermic regenerating conditions by reacting $CO_2$ with carbon and effecting further partial regeneration under exothermic conditions by burning a portion of the carbonaceous deposits with oxygen.

In the specific arrangement of FIG. 1, sequential regeneration of the catalysts may be accomplished with $CO_2$ in the stripper zone, and with oxygen containing gas in a sequence of regeneration zones or one of the regeneration zones such as the last zone may be employed for effecting a partial removal of residual carbon with $CO_2$ rich gas under endothermic regenerating conditions thereby cooling the catalyst. On the other hand initial removal of carbonaceous material may be accomplished with hot $CO_2$ rich gas and then with oxygen containing gas in a second stage. In any of these regeneration arrangements, the sequence of regeneration is selected and controlled to remove hydrocarbonaceous deposits within the management parameters discussed above and to provide a catalyst of low residual coke, less than 0.1% by weight, at a temperature below 1500° F. and preferably below 1400° F. More particularly, regeneration temperatures are maintained in the presence of steam below 1350° F. which will substantially limit or eliminate hydrothermal degradation of the catalyst and yet provide required endothermic temperature input to the reduced crude operation in riser 4.

In a specific embodiment of FIG. 1, the stripped catalyst is passed by conduit 18 to a first stage of catalyst regeneration in catalyst bed 22 maintained in the upper portion of vessel 20. Regeneration gas is provided to the lower portion of bed 22 by conduit 24 to plenum chamber 26 and thence through distributor arm means 27. In addition, gaseous products of regeneration effected in a lower zone comprising bed 34, pass through passage ways 29 in separator baffle 28. Since the regeneration flue gases of the regeneration operation herein contemplated are compatible with one another, the regeneration system of FIG. 1 is a most versatile system for accomplishing desired carbon removal to a desired low level and is implemented to some considerable extent when removing hydrogen with $CO_2$ in the stripping zone. When charging oxygen containing gas by conduit 24 to catalyst bed 22, it is desirable to accomplish a partial burning of the deposited carbonaceous material and hydrogen on the catalyst under restricted conditions of temperature and oxygen concentration providing a flue gas rich in CO. It is desirable to restrict the regeneration temperatures therein from exceeding about 1400° F., and preferably they are restricted not to exceed about 1350° F. Flue gas products of combustion obtained in bed 22 which are CO rich pass through typical cyclone arrangements represented by 30 and in the absence of afterburning for removal of entrained fines before passage to a CO boiler not shown. On the other hand the CO rich flue gas may be passed to a separate combustion zone to burn combustible material such as CO and produce a high temperature $CO_2$ rich gas in the range of 1000° F. to about 1500° F. for use as herein provided.

The partially regenerated catalyst obtained as above provided is passed by one or both standpipes 36 and 40 to bed 34 in the lower portion of the regeneration vessel. A heat exchange means 38 is provided in conduit 36 should there be a need to heat or cool catalyst passed through conduit 36. In a regeneration operation involving two stages of oxygen combustion, heat exchanger 38 may be employed to effect some cooling of catalyst passed through standpipe 36 and before discharge in the lower catalyst bed. In catalyst bed 34, a burning of residual carbon and any hydrogen if present, depending on that accomplished by adding an oxygen containing gas such as air by conduit 42. On the other hand, some $CO_2$ may be added to reduce the concentration of oxygen in the gas employed in the second regeneration zone comprising bed 34. It is also contemplated completing regeneration by reacting $CO_2$ with the residual carbon in bed 34. Regeneration of the catalyst accomplished in bed 34 is a temperature restricted clean-up operation designed and operated to remove residual hydrogen if present and particularly to reduce residual carbon on the catalyst to a low value below about 0.5 wt % and preferably below 0.1 wt %. In this clean-up regeneration operation, it is desirable to restrict the regeneration temperature not to exceed about 1500° F. and preferably the regeneration temperature is restricted not to exceed about 1400° F. or 1450° F. This temperature restriction will remain the same whether oxygen or $CO_2$ regeneration of the catalyst is pursued in this clean up operation.

The catalyst regenerated according to one of the sequences above provided is withdrawn by conduit 44 for passage at an elevated temperature in a lower portion of riser 4. It is contemplated stripping the regenerated catalyst in a stripping zone not shown within or external to bed 34 with $CO_2$ or other gas suitable for the purpose to remove combustion supporting gases from the withdrawn catalyst. It is desirable when the catalyst is regenerated with $CO_2$ or oxygen in bed 34 to strip the catalyst to remove any entrained (CO) carbon monoxide before charging the catalyst to the riser.

It will be recognized by those skilled in the art that the regeneration concepts of this invention may be practiced in many different arrangements of apparatus comprising side by side regeneration systems in the same or different regeneration vessel, in a combination of riser regeneration zones alone or in combination with a dense fluid catalyst bed regeneration zone.

It will also be recognized by those skilled in the art that the regeneration concepts of this invention have particular merit for regenerating a high catalytic activity crystalline zeolite containing catalyst composition comprising high levels of carbonaceous deposits and metal contaminants, which contaminant levels far exceed that normally experienced in conventional gas oil catalyst cracking operations.

The special catalyst composition utilized in the reduced crude cracking operation of the scope and severity defined herein is one characterized as follows:

1. The catalyst comprises at least 30 wt % and preferably at least 35 wt % of rare earth exchanged "Y" faujasite crystalline zeolite of a high lanthanum to cerium ratio greater than 1/1.
2. The catalyst is prepared to provide a pore volume greater than 0.35 cc/gm and comprises a clay matrix material providing substantial pore size openings in the range of 500 to 2000 angstroms, preferably in excess of about 40%.
3. The catalyst is prepared to provide a residual sodium content of less than 0.30 wt % by employing multiple rare earth exchange techniques.
4. The silica to alumina ratio of the crystalline zeolite is at least 5.
5. The matrix material may or may not be acidic.

The special catalyst composition of this invention may be prepared by more than one procedure. A typical procedure which may be employed is provided below:

RCCC-1 Special Preparation

A silica sol was prepared by adding 9.2 L of a sodium silicate (PQ Corp. "N" Brand) to 12 L or a 8 wt % $H_2SO_4$ solution. The addition was made continuously over a 30 minute period. The pH of the sol at this point was 2.0. A total of 10 kg of a kaolinite clay designated Hydrite UF was slurried in 8 L of 2.5 pH water with 30 gms. of sodium pyrophosphate and then added to the silica sol. The pH of the slurry after the kaolinite clay addition is 2.4. A total of 7 kg of a calcined Y (faujasite) zeolite having a silica to alumina molar ratio of at least 5 is slurried with 6 L of 3.0 pH water. The zeolite was previously exchanged before and after a 1050° F. calcination step with a rare earth mixture in which cerium oxide comprises less than 15 wt % of the total rare earth oxides. The exchange after calcination may also be conducted after the slurry is spray dried. Nevertheless, it is the intent to reduce the sodium content of the zeolite to 1.00 wt % or less with a rare earth mixture in which the lanthanum to cerium molar ratio is <3. The zeolite slurry is added to the clay-silica sol slurry to yield a slurry with a pH of 3.0 which was spray dried at an inlet temperature of 800° F. and outlet temperature of 300° F. The product was washed a total of three time with a large excess of 150° tap water for 30 minutes.

Next the catalyst was again rare earth exchanged 3 times with a solution containing 3–10% rare earths at a temperature of 150° for 30 minutes each. The solutions are separated from the catalyst and the particles are washed and dried at 350° F.

Three different catalyst compositions prepared following the procedure above identified and identified as RCCC-1 Special 1, 2 and 3 were analyzed and found to comprise the compositions identified in Table D below.

TABLE D
COMPOSITION OF RCC CATALYST

| ELEMENTAL COMPOSITION WT % I.B. | RCCC-1 Sp. 1 | RCCC-1 Sp. 2 | RCCC-1 Sp. 3 |
| --- | --- | --- | --- |
| P.V. (500–2000 A) | 0.16 cc/g | 0.19 cc/g | 0.09 cc/g |
| % of Total P.V. (500–2000 A) | 43% | 51% | 33% |

It will be observed that the catalyst compositions above identified varied in composition and Special #2 comprised the lowest sodium content of the three catalyst preparations. Special #3 was less than particularly desired because of low pore vol. (cc/g) and only 33% total pore vol. in 500–2000 A range.

The catalyst compositions of Table D were used in a series of tests in a reduced crude cracking (RCC) operation at a reactor temperature of about 1000° F., a reactor pressure of about 15 psig and a hydrocarbon residence time in the range of 1.3 to 1.9 seconds and more usually about 1.7 seconds. Steam was charged with the reduced crude feed composition identified in Tables A and C. The oil feed partial pressure was determined to be in the range of about 5.5 to about 6.0 and more usually about 5.7 psia.

A further evaluation of the series of tests reported showed that the metals on the catalyst where in the following ranges; Ni ppm in the range of 2000 up to 2500 and vanadium (V) ppm in the range of 7500 to about 9200 ppm. The Ni+V was normally at least about 8000 ppm up to about 12,000 ppm. However, it is contemplated carrying a much higher level of metals, particularly when passivating vanadium deposits by forming high temperature compositions with additive materials suitable for the purpose. Metals suitable for this purpose are discussed below.

A summation of the data obtained in the series of tests above identified is reported in the following Table E under the headings, "As Found" and "Vol % Yields @ Vol % Conv.".

TABLE E
RCC CATALYST SUMMARY COMPARISON PETROLEUM PRODUCTS DISTRIBUTION

| CATALYST | RCC OPERATION PERIOD | As Found Conv. Vol. % | As Found Gaso. Vol. % | As Found Gaso. Select | Gaso. | 430–630° F. | 630° F. + | 1-C4 | C3 + C4 Olefins | Coke Wt. % | H2SCF bbl | nC4 | nC3 | Dry Gas (Wt. %) |
| --- | --- | --- | --- | --- | --- | --- | --- | --- | --- | --- | --- | --- | --- | --- |
| RCCC-1 Sp'l #1 | (RCC 82–86) | 69.3 | 43.5 | .63 | 44.0 | 12.2 | 17.8 | 4.3 | 17.5 | 12.4 | 129 | 1.2 | 2.4 | 5.4 |
| RCCC-1 Sp'l #2 | (RCC 116–121) | 72.1 | 44.6 | .62 | 43.3 | 12.0 | 18.0 | 6.0 | 17.7 | 11.0 | 96 | 1.6 | 2.8 | 3.2 |
| RCCC-1 Sp'l #3 | (RCC 130–136) | 67.1 | 40.5 | .60 | 42.3 | 10.2 | 17.9 | 5.3 | 19.2 | 12.3 | 129 | 1.6 | 3.1 | 6.0 |

| WT % I.B. | Sp. 1 | Sp. 2 | Sp. 3 |
| --- | --- | --- | --- |
| ZEOLITE | 40* | 41* | |
| CREY | 35 | 39 | 38 |
| $SiO_2$ | 68.6 | 65.8 | 70.3 |
| $Al_2O_3$ | 25.8 | 24.8 | 27.6 |
| $TiO_2$ | 1.18 | 1.04 | 1.16 |
| $Fe_2O_3$ | 0.49 | 0.18 | 0.21 |
| $Na_2O$ | 0.26 | 0.15 | 0.28 |
| $La_2O_3$ | 3.10 | 3.29 | 3.80 |
| $CeO_2$ | 2.30 | 2.06 | 1.60 |
| $Nd_2O_3$ | 1.11 | 1.18 | 1.36 |
| $Pr_6O_{11}$ | 0.39 | 0.41 | 0.50 |
| ($RE_2O_3$ total) | 6.90 | 6.94 | 7.26 |
| La/Ce | 1.35 | 1.60 | 2.38 |
| Total Pore Volume % cc/g | 0.37 | 0.37 | 0.28 |

It will be observed upon evaluation of the data that the special catalysts compositions herein identified and employed were acceptable catalyst compositions for short-term use in cracking the reduced crude feeds identified and it is clear that Special 1 and 2 catalysts and particularly Special #2 of the lowest sodium content (0.15 wt %) provided the best results with respect to conversion level and "as found" gasoline yield. However, when the results were put on a common basis of 70 vol % conv. catalyst Special #1 produces more gasoline product and more coke when compared with the other two catalysts. On the other hand, Special catalyst #2 produced substantially less hydrogen and less dry gas as well as a lower amount of coke.

Another comparison of the high cracking activity of the equilibrium catalyst of this invention as related to catalyst activity maintenance is given in Table F below. RCCC-1 Special #2 was utilized in an extended series of reduced crude cracking tests. The equilibrium RCCC-1 Special #2 catalyst containing approximately 10,000 ppm metals as Ni+V was then utilized to study the conversion of 100% (VGO) vacuum gas oil for comparison of its activity to standard normal VGO operations. As shown in Table F, reduced crude conversion is an extremely severe test of a catalyst's ability to maintain constant catalyst activity over an extended period of time. In run 96, a reduced crude processed over an equilibrium RCCC-1 Special #2 catalyst gave approximately 66 volume % conversion with a gasoline yield of 41 volume %. When a 100% VGO feedstock was processed over the same equilibrium catalyst (Run 97), conversion increased to 78 volume % with a gasoline yield of 55 volume %. Runs 122 and 125 show the same trend for reduced crude conversion with an increase in conversion and gasoline yield when switched to 100 volume % VGO feedstock (Runs 123 and 124). This comparison of reduced crude and VGO processing shows the rugged characteristics of the catalyst of this invention, namely, RCCC-1 Special. It provides a high conversion rate of reduced crude to gasoline and when switched to 100 volume % VGO operation, is as active as any commercial FCC gas oil catalyst even though it contains a high Ni+V content, approximately 10,000 ppm metals.

nized that of these metals, Ni, V, Fe and Cu exist as metal contaminants in reduced crudes. Thus in the catalytic cracking operation of this invention it is proposed to employ these less expensive and readily available metal promoters to catalyze the reaction of carbon with $CO_2$. It has been found, that a preferred amount of the metal additive to catalyze the reaction will be in the range of about 0.2 to 5 wt % and preferably it should be at least 0.5 wt % and sufficient to promote the reaction at temperatures in the range of 1300° F. to 1500° F. and preferably about 1400° F.

Results of Preferred Metal Additives 1 wt % of additive metal was tested at 1400° F. for 20 minutes to a carbon on catalyst level of 1.1 wt %.

| Metal | Coke Removal Rate % |
|---|---|
| Fe | 50 |
| Cu | 45 |
| V | 35 |
| Ni | 50 |

An important aspect of this invention is the utilization of the metals deposited in a cracking catalyst during carbo-metallic oil feed processing. The catalytic processing of a reduced crude containing 100 ppm Ni+V and a Conradson carbon value of 7-8 wt % provided catalyst samples withdrawn at different times in the cycle. This permitted a study of the effect of changing

TABLE F

RCCDU CATALYST ACTIVITY COMPARISON
REDUCED CRUDE vs. VGO OPERATIONS
CATALYST: RCCC-1 10/80 Sp'l #2[b]

| Feedstock[a] | Run # | | | | | | |
|---|---|---|---|---|---|---|---|
| | 96 ABL/DUBAL | 97 100% VGO | 98 ITM/MAYA | 122 ITM/MAYA | 123 100% VGO | 124 100% VGO | 125 ABL/DUBAL |
| Reactor Temp., °F. | 999 | 979 | 999 | 1000 | 980 | 980 | 998 |
| Residence time - Sec. | 1.8 | 2.6 | 1.8 | 1.4 | 2.5 | 2.5 | 1.4 |
| C/O Ratio | 11.5 | 11.8 | 10.8 | 9.8 | 9.0 | 11 | 11 |
| Conversion - Vol % | 66.5 | 77.8 | 68.9 | 71.3 | 80.3 | 79.3 | 71.4 |
| Gasoline Yield - Vol % | 41.2 | 55.0 | 45.9 | 43.0 | 54.3 | 53.3 | 42.3 |
| Gasoline Select. - Vol % | 62 | 71 | 66 | 60 | 68 | 68 | 59 |

[a]See Table A for feedstock properties
[b]See Table A for catalyst properties

This invention encompasses a new approach to offsetting the adverse effects of high temperature regeneration of solids comprising high Conradson carbon residues of reduced crude catalytic cracking as above provided in conjunction with incorporating one or more of a select group of additive metals, their oxides or their salts into the catalyst matrix material either during catalyst manufacture or by addition thereto during the cracking-regeneration operation. The select metal additives were chosen in a study which would catalyze the endothermic removal of carbon with $CO_2$ from a catalyst comprising residual carbon and/or hydrocarbonaceous material. The identified metal additives catalyze the reaction of carbon with $CO_2$ at a rate sufficient to remove up to about 40 wt % or greater of the carbon as an endothermic reaction. The metals found suitable for this purpose include: Li, Na, K, Sr, V, Ta, Mo, Re, Fe, Co, Ni, Ru, Rh, Pd, Os, Ir, Pt, Cu, Ag, Au, Sn and Bi. The metal additives based on the metal element content may be used in concentrations in the range of 0.1 wt % (1000 ppm) to about 1.0 wt % (100,000 ppm) and more usually in the range of from about 0.5 wt % (5000 ppm) to about 5 wt % (50,000 ppm). It will be further recognized that of these metals, Ni, V, Fe and Cu exist as concentrations of Ni+V on the catalyst to catalyze the endothermic removal of carbon by reaction with carbon dioxide to form carbon monoxide. The results of these tests are provided in table below.

| RCC Cracking Catalyst Test Conditions: 25 g catalyst, 1400° F.; 1 cu. ft., $CO_2$ per hr. | |
|---|---|
| Ni + V ppm | Coke Removal % |
| 500 | 22 |
| 5700 | 22 |
| 8100 | 38 |

These results show that at 5700 ppm Ni+V, a carbon removal rate of 22% is found to be not rapid enough to treat feeds of high Conradson carbon levels. However, at high levels of about 8000 ppm Ni+V, the rate of coke removal is sufficient high for use with the higher Conradson carbon feed values up to about 20 wt %.

A further more detailed discussion of the additive metals suitable for promoting the reaction of $CO_2$ with C is found in copending application Ser. No. 290,277 filed 8/5/81 now U.S. Pat. No. 4,425,259 incorporated herein by reference thereto.

In yet another aspect, the processing combination of the present invention contemplates a substantial improvement at least with respect to prolonging catalyst life in a fluid particles operation by restricting some adverse effects of accumulated vanadium on the catalyst. That is to say, it has been observed that as the vanadia content of the catalyst increases above 5000 ppm and into the range of 10,000 to 30,000 ppm thereof, the fluidization of particles becomes increasingly difficult until plugging in the riser reactor and catalyst diplegs is realized. It thus has been found that vanadium pentoxide and sodium vanadates build up on the catalyst particles and elevated regeneration temperatures cause the vanadium compounds to flow or form a liquid coating on the catalyst particles contributing to coalescence between particles to form an agglomerated mass of particles. This condition results in stoppage of particle flow in restricted areas such as cyclone diplegs, causes ineffective operation of cyclones, accumulation in refractory lining contributing to spalling and rapid inactivation of cracking sites by plugging of the catalyst pores. The presence of large pore volume catalyst of at least 0.35 cc/gm and a substantial percentage of pore size greater than 500 angstroms contributes measurably to deposited metals trapping and thus contributes to effecting immobilization of vanadium or collectively the oxides of vandadium. Vanadium pentoxide for example flows as a liquid at temperatures below 1400° F. Although a number of additive metals are disclosed in a copending application Ser. No. 281,797, filed 7/9/81, for immobilizing vanadia accumulated on sorbent particle material, some of these may be employed with equivalent immobilizing results with the special high zeolite containing cracking catalyst of this invention. In particular, one may employ one or more metal additives such as Si, Al, Ti, Zr, a Group VIII transition metal and lanthanum or the lanthanide series. Furthermore, vanadia may be immobilized by formation of ternary, quaternary and higher component mixtures as well as vanadium sulfides, sulfates and oxysulfides and other compounds disclosed in copending application Ser. No. 281,797, filed 7/9/81, the disclosure of which is incorporated by reference thereto. Thus, one or more of the above identified additive metals may be employed to immobilize vanadia deposits in the catalyst whereby the high activity crystalline zeolite catalyst composition may be employed over an extended operating period.

It will thus be readily apparent to those skilled in the art that the combination of operating control parameters in combination with the special catalyst of this invention provide a novel combination of cooperative parameters permitting desired conversion of high boiling hydrocarbon feeds known as reduced crudes and residual oils comprising high boiling carbo-metallic hydrocarbon components in a desirable and economic manner.

Having thus generally described the novel concepts of the invention and specifically described particular involvements in support thereby, it is to be understood that no undue restrictions are to be imposed by reason thereof except as defined by the following claims:

We claim:

1. A catalyst composition for cracking hydrocarbons boiling above 650° F. and comprising carbo-metallic impurities of naphthenes and asphaltenes comprising at least about 35 wt % of a calcined rare earth exchanged "Y" crystalline faujasite dispersed in a clay containing matrix material, said catalyst composition providing a pore volume of at least 0.35 cc/g, a matrix material providing a substantial amount of pore size openings within the range of 500 to 2000 A, said catalyst composition comprising a residual sodium content of less than 0.30 wt % and said catalyst composition being rare earth exchanged during preparation to provide a lanthanum to cerium ratio greater than 1.3:1.

2. A catalyst composition comprising greater than 30 wt % of rare earth exchanged "Y" faujasite zeolite having a lanthanum to cerium ratio greater than 1.3:1, said zeolite dispersed in a kaolin matrix material providing pore size openings in the range of 500 to 2000 angstroms and said catalyst composition comprising less than 0.30 wt % residiual sodium after multiple exchanges with a high ratio of lanthanum to cerium rare earth mixture.

* * * * *